Oct. 4, 1955        F. D. MATRAS        2,719,381
FISHING BOBBER WITH ADJUSTABLE LINE RETAINING HOOK
Filed Nov. 17, 1954
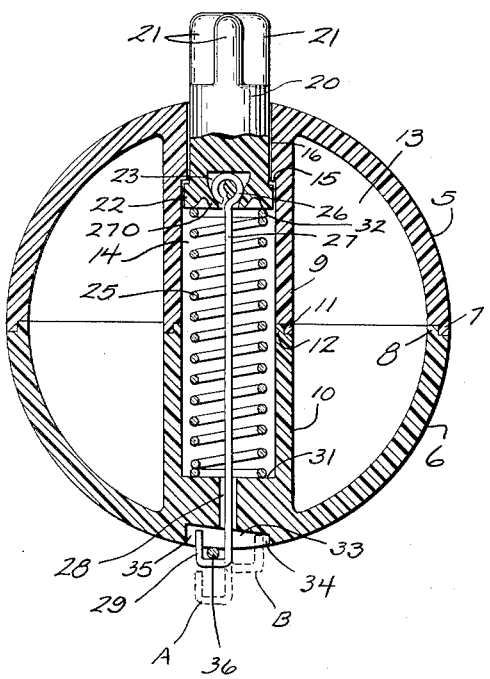
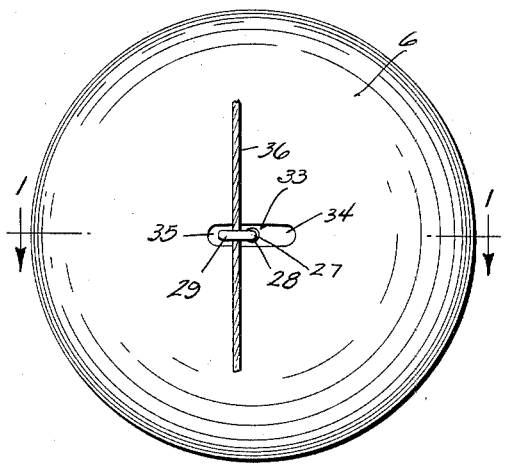
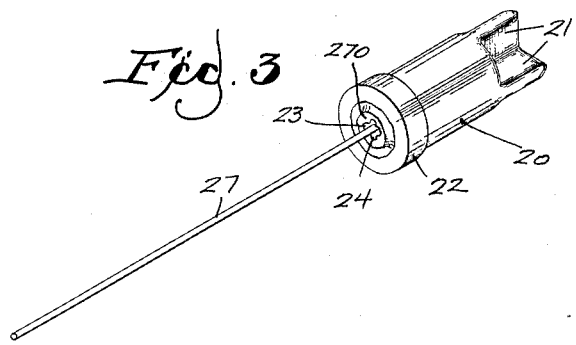
INVENTOR.
FRANK D. MATRAS
BY
Wheeler, Wheeler & Wheeler
ATTORNEYS

United States Patent Office 2,719,381
Patented Oct. 4, 1955

2,719,381

FISHING BOBBER WITH ADJUSTABLE LINE RETAINING HOOK

Frank D. Matras, Milwaukee, Wis., assignor to Frabill Mfg. Co., Milwaukee, Wis., a corporation of Wisconsin Application November 17, 1954, Serial No. 469,391

3 Claims. (Cl. 43—44.95)

This invention relates to a fishing bobber with a line retaining hook adjustable to clamping position. The present device is an improvement on the construction disclosed in my Patent 2,670,560 of March 2, 1954.

The present device provides a button which is rotatably and yieldably mounted in the bobber to facilitate manipulation of the line engaging hook to its various positions of line release, line retention and line clamp. By devoting a larger portion of the interior of the float to the compression spring, I am able to use a spring which has adequate strength and which is nevertheless easily depressed in manipulation of the parts. By reason of the simplified construction involved, the cost of manufacture has been substantially reduced and the assembly simplified and the anticipated life of the device increased.

The float comprises a pair of molded plastic hemispheres having mating radial tubes forming a spring chamber. A hook shank rod extends centrally through the chamber. One end projects from the float and is formed to provide a hook. A spring within the chamber encircles the rod. One end of the rod is molded into a plastic button which receives the spring pressure and projects from the spring chamber at the opposite side of the float from the hook. The hook is receivable in different positions of angular adjustment into a single channel of progressively varying depth molded into the float.

In the drawings:

Fig. 1 is a view in axial section taken on the line 1 of Fig. 2 through a fish bobber embodying the invention, the push button being shown in full with portions broken away.

Fig. 2 is a bottom plan view of the bobber shown in Fig. 1.

Fig. 3 is a detail view in perspective of the push button by which the line engaging hook is manipulated, the hook shank being shown inserted therein in its form prior to the bending of the hook.

The bobber comprises a float which is generally spherical in the embodiment illustrated and is made up of plastic molded hemispheres 5 and 6 having complementarily mated margins at 7 and 8 joined together with any suitable cement. Each of the hemispheres has a central integral tubular portion, these being designated by reference characters 9 and 10 and likewise having complementarily shouldered mated margins at 11 and 12 joined by cement.

The construction described forms a sealed annular air chamber 13 within the float and a spring chamber at 14 within the registering tubular portions 9 and 10 of the respective hemispheres. Any water finding access to the spring chamber 14 through the small openings in its ends cannot reach the air chamber 13 due to the joint between the shoulders 11 and 12.

Tubular portion 9 of hemisphere 5 is shouldered at 15. In its reduced extremity 16 is fitted the button 20. This button has outwardly exposed ribs 21, whereby it is substantially cruciform in plan. These ribs facilitate its manipulation. The portion of the button fitted within the bore 16 is cylindrical, the button being rotatable and axially reciprocable in bore 16. At its inner end, the button 20 is flanged at 22, the flange being biased by the spring 25 to seat upon the shoulder 15.

Button 20 is desirably, though not necessarily, formed with an interior cavity which may comprise longitudinally extending and transversely intersecting slots 23 and 24. For imbedding the hook shank wire 27 directly in the button after the button has been molded, I form its end with any kind of an enlargement 26, which is inserted into one of the slots 23 or 24 and anchored by softening the plastic of the button and pushing it about the shank 27 and its enlargement 26, as shown at 270 in Fig. 1, to seal the shank permanently to the button for axial and rotative movement therewith. From the button, the wire shank extends directly through the spring 25 and through a bore 28 in hemisphere 6. Outside the float, the shank 27 is formed to provide a hook 29.

The spring 25 is desirably a helical spring seated against the shoulder 31 of hemisphere 6. The upper end portion 32 of the spring biases in a direction to urge the button outwardly toward a terminal position in which the button flange 22 engages the shoulder 15 as above described.

Since wire 27 is anchored in the button, the shank 27 and the hook terminal portion 29 thereof, are likewise subject to spring bias. The spring bias urges the hook toward the hemisphere 6 of the float, which is provided with a transverse channel 33 of graduated depth. The opening 28 in which the wire rod 27 is guided for rotation and reciprocation, opens into an intermediate portion of channel 33 between the shallow end 34 thereof and the deep end 35 thereof.

The arrangement is such that no mechanical connection between the metal parts is required. The assembly of the metal parts within the spring chamber portion 10 of hemisphere 6 is accomplished by simply inserting the hook shank rod 27 into the spring and projecting it through bore 28. It may be formed with hook 29 subsequently to the assembly of the hemispheres.

With the button 20 inserted in the bore 16 of hemisphere 5 and the spring and wire rod assembly inserted in the tubular portion 10 of hemisphere 6, the two hemispheres are brought together, the mating portions of the margins of at least one of them being coated with an adhesive. They must be held together with sufficient pressure to overcome the bias of spring 25 until the adhesive sets.

Axial pressure on the button will be transmitted through the hook shank 27 to the hook 29 to displace the hook from the channel 33. Thereupon the rotative movement of button 20 will be communicated through the shank 27 to the hook 29, whereby the hook may be registered either with the deep end or the shallow end of channel 33. Release of the button will permit the spring to restore the button to its original position and to engage the end of hook 29 with the bottom of the channel to permit a greater or lesser portion of the bight of the hook to project from the adjacent surface of hemisphere 6.

There are three well defined positions which the hook 29 may occupy. In Fig. 1, the hook is illustrated in the dotted line position A in a line releasing position in which the entire hook is spaced from the float sufficiently so that the fishing line 35 may be passed freely into or out of the hook. The hook can be in this position only so long as it is held there against the bias of spring 25 by pressure on button 20.

In its dotted line position B, the free end of the hook is engaged in the shallow end 34 of channel 33, whereby the hook will be supported with a sufficient portion of its bight exposed so that the fishing line, although retained within the hook will nevertheless run freely through the hook.

In the full line position of Fig. 1, the hook is disposed in the deep end 35 of channel 33, which accommodates most of the bight of the hook, whereby a fishing line 36 engaged within the hook will be clamped against the contiguous external surfaces of the hemisphere 6 at the margins of the channel into which the hook is otherwise receivable.

It will be evident that the hook may readily be moved between these several positions by manipulating the button 20.

While the component parts of the float have been referred to as hemispheres, it will be understood that their actual form is immaterial to the invention.

I claim:

1. A fishing bobber comprising a float provided with a bore and an external channel of varying depth into which said bore opens, the channel being shallow at one side of the bore and deep at the other, a hook having a shank reciprocable and rotatable in the bore, the hook having a free end portion engageable with the float at the bottom of said channel upon being turned to register with the shallow or the deep portion of the channel, and means within the float biasing the hook into engagement of its free end portion with the float.

2. In a fishing bobber, the combination with a float internally provided with a tubular spring chamber and said chamber having a large bore at one end thereof and a small bore at the opposite end opening to the outside of the float, said chamber being shouldered at the junction thereof with each of said bores, a button rotatably and reciprocably bearing in the larger bore and having a flange engaged with the shoulder therein, said button projecting from the float, a hook projecting from the float opposite from the button and having a shank portion rotatably and reciprocably bearing in the small bore, said shank portion extending through the spring chamber and being in motion-receiving engagement with said button, and a spring in said chamber engaging the button and extending thence about the shank under compression to the shoulder at the junction of the spring chamber and the small bore and seated on said shoulder, the float being externally provided with a channel of varying depth with which the small bore aforesaid communicates at a level between maximum and minimum channel depth, the said hook being subject to movement upon manipulation of the button between a line clamping position in the deeper part of the channel, a line running position in the shallower part of the channel and a line releasing position free of the channel, the spring acting upon the button to bias the button outwardly of the float.

3. A fishing bobber comprising a float internally provided with a spring chamber and said chamber having a larger and a smaller bore opening therefrom to the exterior of the float, a button rotatably and reciprocably mounted in the larger bore and provided with a means engaged with a portion of the float within the spring chamber whereby to limit outward movement of the button in the larger bore, a rod having a terminal portion engaged with the button and extending thence through the smaller bore and having guidance in the smaller bore for rotation and reciprocation, said rod being provided with a line engaging means externally of the float, and a compression spring disposed in the spring chamber and having a seat adjacent to said smaller bore, the said button being provided with an opposing seat with which said spring is also engaged, the bias of the spring being transmitted to the button and being also effective upon the line engaging means aforesaid, said line engaging means being in sufficient proximity to the float to cooperate with the float in clamping a fishing line against the exterior of the float subject to said bias, pressure on the button being adapted to displace the line engaging means outwardly from the float to relieve clamping pressure of said means toward the float.

References Cited in the file of this patent

UNITED STATES PATENTS

| | | |
|---|---|---|
| 1,371,170 | Johnson | Mar. 8, 1921 |
| 2,527,437 | Matras | Oct. 24, 1950 |
| 2,627,693 | Wanner | Feb. 10, 1953 |
| 2,670,560 | Matras | Mar. 2, 1954 |

FOREIGN PATENTS

| | | |
|---|---|---|
| 683,430 | Great Britain | Nov. 26, 1952 |